United States Patent [19]

Hochart et al.

[11] Patent Number: 4,853,520
[45] Date of Patent: Aug. 1, 1989

[54] DEVICE FOR FIXING A WINDOW-PANE ON A RIGID FRAME

[75] Inventors: Paul Hochart, La Longueville; Gilbert Pagnucco, Maurepas; Marceau Bertrand, Boussois; Alain Bertrand, Jeumont, all of France

[73] Assignee: Boussois S.A., Levallois-Perret, France

[21] Appl. No.: 195,680

[22] Filed: May 11, 1988

[30] Foreign Application Priority Data

May 20, 1987 [FR] France ................. 87 07049

[51] Int. Cl.⁴ ............... B60R 13/06; C03C 27/04
[52] U.S. Cl. .................... 219/535; 219/202; 219/203; 296/84.1
[58] Field of Search ........... 219/200, 201, 202, 203, 219/535; 296/84.1

[56] References Cited

FOREIGN PATENT DOCUMENTS

| 0057522 | 8/1982 | European Pat. Off. . |
| 0081426 | 6/1983 | European Pat. Off. . |
| 59-34917 | 2/1984 | Japan . |
| 2168742 | 6/1986 | United Kingdom . |

Primary Examiner—A. D. Pellinen
Assistant Examiner—Leon K. Fuller
Attorney, Agent, or Firm—Young & Thompson

[57] ABSTRACT

A window-pane (2) such as an automobile windshield or rear window to be fixed on a rigid frame is provided at its periphery with a bead (5) of thermoplastic material. The device (1) for fixing the window-pane comprises a sectional strip (9) of plastic material to which is secured a resistance-type heating element (10) of resilient metal having a substantially U-shaped cross-section. One wing of the heating element (10) is secured to the sectional strip (9) and the other wing (19b) is free with respect to the strip so as to form therewith a clip which is capable of resilient engagement on the wall (8) of the rigid frame (3).

9 Claims, 2 Drawing Sheets

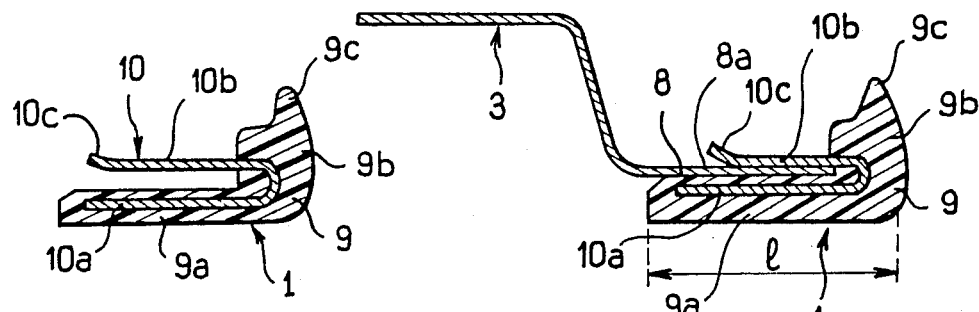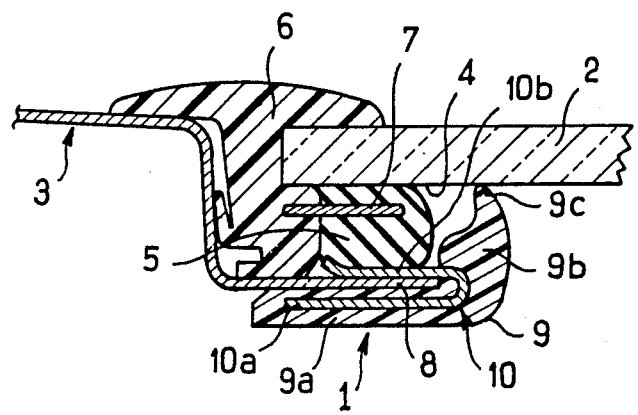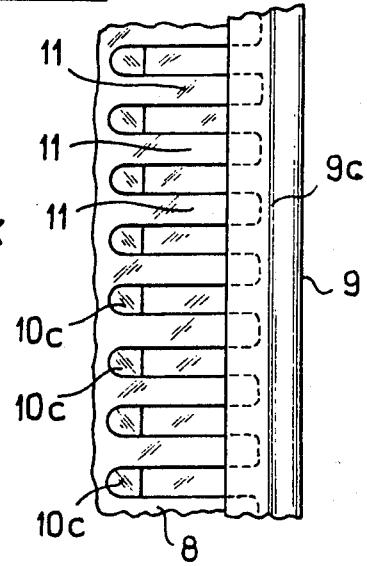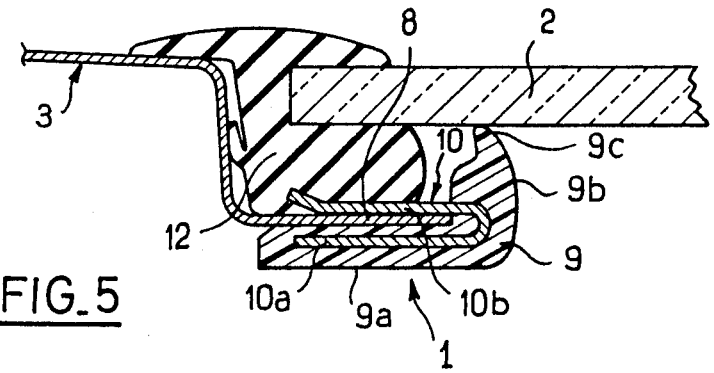

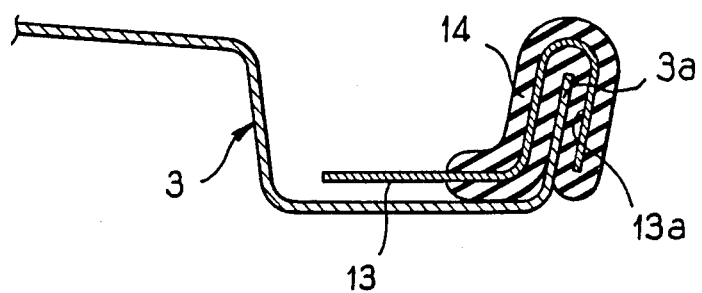
FIG_6

DEVICE FOR FIXING A WINDOW-PANE ON A RIGID FRAME

BACKGROUND OF THE INVENTION

1. Field of the Invention

The present invention relates to a device for fixing a window-pane and in particular an automobile windshield, rear window or quarter-panel window on a rigid frame, said window-pane being provided with a bead of thermoplastic material at its periphery and on that face which is intended to be applied against the rigid frame.

2. Description of the Prior Art

Fixing of the window-pane on the rigid frame is carried out by heating the bead of thermoplastic material either by means of hot air or by means of infrared radiation or by Joule effect. In the case of Joule heating, a resistance-type heating element is incorporated in the bead of thermoplastic material.

In view of the fact that said heating element is partly embedded in the thermoplastic material of the bead, the Joule heating time required for ensuring that the external surface of the thermoplastic material attains a sufficient temperature to obtain bonding is of relatively long duration (of the order of four minutes in the case of installation of an automobile windshield).

In order to reduce the heating time when fitting window-panes on a mass-production line, a current practice accordingly consists in making use of complementary heating means such as hot air or infrared radiation which are applied both to the bead of thermoplastic material and to the rigid frame.

These complementary heating means must be used with care in order to guard against the phenomenon of surface glazing of the thermoplastic bead.

Moreover, when installing a window-pane, the thermoplastic bead is flattened against the rigid frame in a more or less uniform manner, thus having an unattractive appearance when seen from the interior of the window.

The object of the present invention is to overcome the disadvantages of the known designs discussed in the foregoing.

SUMMARY OF THE INVENTION

The device contemplated by the invention is intended to fix a window-pane and in particular an automobile windshield or rear window on a rigid frame, said window-pane being provided with a bead of thermoplastic material at its periphery and on that face which is intended to be applied against the rigid frame, said rigid frame being constituted by a wall which is intended to receive said bead and which extends toward the interior of the frame.

In accordance with the invention, said device essentially comprises a sectional strip of plastic material to which is fixed a resistance-type heating element of resilient metal having a substantially U-shaped cross-section, one of the wings of said element being secured to the sectional strip and the other wing being free with respect to said strip so as to form therewith a clip which is capable of resilient engagement on said wall of the rigid frame.

When said sectional strip is in position on the rigid frame wall which is intended to receive the thermoplastic bead, the free wing of the heating element is resiliently applied against that face of the wall which is intended to receive the thermoplastic bead, thus establishing a mechanical bond between said wall and said strip.

At the time of installation of the window-pane, the thermoplastic bead which is secured to the periphery of this latter bears on the aforesaid wing of the heating element. By passing a suitable electric current within said heating element, this produces direct heating of the contact surface between the thermoplastic bead, the wing of the heating element and the wall of the frame, that is to say precisely the surface which is to be bonded. The heating time is thus very short and the use of complementary heating means is no longer necessary.

As can readily be understood, the plastic material to which the heating element is secured so as to form a fastening clip must neither decompose nor flow at the heating temperature employed.

In a preferred embodiment, one of the wings of the heating element is embedded in the plastic material of the sectional strip. This expedient constitutes a convenient means for securing the heating element to the strip.

In an advantageous embodiment of the invention, the width of the sectional strip is so determined as to ensure that this latter covers substantially the entire surface of the frame wall opposite to the wall which is intended to receive the thermoplastic bead, and the free wing of the heating element is so shaped that it can be resiliently applied on the surface of the frame wall which is intended to receive the bonding bead, the length of said wing being sufficient to ensure that this latter comes into contact with the bead of thermoplastic material which is placed at the periphery of the window-pane.

By virtue of these arrangements, the device in accordance with the invention constitutes a finishing seal, thus providing an attractive covering of the frame-wall face which is visible on the inside of the window-pane while at the same time masking and insulating the heating element.

Moreover, an optimum contact surface is provided between the free and resilient wing of the heating element and the thermoplastic bead, thus permitting a rapid temperature rise of the bead in that zone in which this latter is to be bonded to the rigid frame.

In a particularly advantageous embodiment of the invention, the sectional strip of plastic material has a substantially L-shaped cross-section, one of the wings of said strip being intended to cover the framewall surface opposite to the surface which is intended to receive the bead of thermoplastic material and the other wing being intended to extend toward the exterior of the frame. Said other wing of the strip thus masks the bonding bead while limiting overflow of the seal toward the interior of the frame.

By virtue of this arrangement, the device in accordance with the invention constitutes a seal which has a particularly attractive finish and general appearance.

BRIEF DESCRIPTION OF THE DRAWINGS

FIG. 1 is a transverse sectional view of a device in accordance with the invention.

FIG. 2 is a partial sectional view of a rigid frame to which the device in accordance with the invention is secured.

FIG. 3 is a top view of FIG. 2, the frame having been broken away.

FIG. 4 is a sectional view showing a window-pane in position within the rigid frame.

FIG. 5 is a view which is similar to FIG. 4 and relates to an alternative embodiment.

FIG. 6 is a partial sectional view of an alternative form of construction of a rigid frame to which the device in accordance with the invention is secured.

DESCRIPTION OF THE PREFERRED EMBODIMENTS

In the embodiment of FIGS. 1 to 4, the device 1 is employed for fixing a window-pane 2 such as an automobile windshield or rear window on a rigid metal frame 3. As shown in FIG. 4, the window-pane 2 is fitted with a thermoplastic bead 5 at its periphery and on that face 4 which is intended to be applied against the rigid frame 3.

In the example shown in FIG. 4, the thermoplastic bead 5 is applied against a finishing seal 6 of elastomeric material placed at the periphery of the window-pane. Said seal 6 is joined to the thermoplastic bead 5 by means of a metallic insert 7 constituting an electric heating element which serves to melt the thermoplastic bead and thus to apply this latter against the window-pane in a strong adhesive bond. French patent No. 2,547,345 describes a window-pane of this type which is ready for installation and provided with a heating insert for bonding both to the glass and to the rigid frame. However, as described earlier, the bonding time is of long duration. By means of the device fixed on the rigid frame in accordance with the invention, the installation time can be considerably reduced.

The rigid frame 3 has a wall 8 which is intended to receive the thermoplastic bead 5 and extends toward the interior of the frame 3. The device 1 comprises a sectional strip 9 of plastic material to which is secured a resistance-type heating element 10 cut in a resilient metal strip having a substantially U-shaped cross-section. One of the wings 10a of said heating element 10 is embedded in the plastic material of the sectional strip 9 and the other wing 10b is free with respect to said strip. Thus the free and resilient wing 10b forms with the sectional strip 9 a clip which is capable of resilient engagement on the wall 8 of the rigid frame 3 as indicated in FIGS. 2, 3 and 4.

The width 1 of the sectional strip 9 is so determined that this latter covers substantially the entire surface of the frame wall 8 opposite to the wall which is intended to receive the thermoplastic bead 5.

As indicated in FIGS. 2 and 4, the free wing 10b of the heating element 10 is so shaped that it can be resiliently applied against the surface 8a of the frame wall 8 which is intended to receive the thermoplastic bead 5. To this end, the length of said wing 10b is sufficient to ensure that this latter comes into contact with the bead 5 of thermoplastic material which is placed at the periphery of the window-pane 2.

It is further apparent from FIG. 3 that the free wing 10b of the heating element 10 has recesses 11 formed for example between teeth or the like. The object of said recesses 11 is to endow the heating element 10 with a sufficient value of resistance which takes into account the Joule-effect heating to be obtained. A further purpose of the recesses 11 is to ensure that the thermoplastic bead 5 adheres to the surface 8a of the wall 8 after surface melting.

Moreover, the edge 10c of the heating element 10 is bent outwards in order to facilitate engagement of the device 1 on the wall 8.

In order to guard against any short-circuit between the metallic wall 8 and the heating element 10, the surface 8a of said wall is coated with a thin insulating layer such as enamel (not shown) which affords resistance to the heating temperature.

In the example shown, the sectional strip 9 of plastic material has a substantially L-shaped cross-section. The wing 9a of said strip in which the portion 10a of the heating element 10 is embedded covers the surface of the frame wall 8 on the side opposite to the surface which receives the bead 5 of thermoplastic material. The other wing 9b extends toward the exterior of the frame 3. The length of this other wing 9b of the strip 9 is substantially equal to the thickness of the thermoplastic bead 5 when the window-pane 2 is installed within the frame 3 as shown in FIG. 4.

Moreover, the edge of the wing 9b of the strip 9 has an elastic lip 9c which is intended to be resiliently applied against the internal face 4 of the window-pane 2. Thus the strip 9 completely closes the space formed between the window-pane 2 and the wall 8 of the frame 3, the internal face of said frame wall being in addition completely masked by the wing 9a of the strip 9.

In order to fix the window-pane 2 within the rigid frame 3, the procedure is as follows (for example in the case of a fixed side window of an automobile of the Citroën BX type).

The device 1 is engaged on the wall 8 of the frame 3 and the heating element 10 is connected to an electric current supply.

The window-pane 2 pre-equipped with the finishing seal 6 and bead 5 of thermoplastic material is placed in position on the rigid frame 3 so that said bead 5 bears on the wing 10b of the heating element 10.

Electric current is then passed through the heating element 10 and through the metallic heating insert 7. The heating thus obtained causes very rapid melting of the bead 5 which is thus permitted to adhere on the one hand to the frame wall 8 and on the other hand to the window-pane 2.

Moreover, the wing 9b of the strip 9 prevents any lateral overflow of the bead 5 and completely masks this latter from the interior of the window-pane 2.

The plastic material of the strip 9 must be sufficiently flexible to be capable of closely conforming to the contour of the frame 3. In addition, this material must clearly be capable of withstanding the heating temperature produced by the element 10.

By way of example, the sectional strip 9 can be fabricated from the copolymer known as ethylene-propylene-diene-methylene (EPDM).

In the embodiment shown in FIG. 5, the window-pane 2 is provided at its periphery with a bonding bead 12 made entirely of thermoplastic material and preformed so as to be capable of occupying substantially the entire space located between the edge of the window-pane 2 and the frame 3. A window-pane of this type which is ready for installation has been described in French patent No. 86 17818 granted to the present applicant.

The device 1 is identical with that shown in FIGS. 1 to 4. In the example of FIG. 5, the heating element 10 alone has the function of melting the thermoplastic bead 12.

Two examples of practical application of the device in accordance with the invention are given hereinafter.

EXAMPLE 1

The peripheral seal 12 (see FIG. 5) mounted on the window-pane 2 has been obtained by overmolding and does not contain any metallic insert.

The thermoplastic adhesive employed for the seal 12 has a base of polyether-polyamide as marketed by the Atochem Company under the reference NF 166.

The anti-overflow strip 9 with its heating element 10 is formed with the same elastomeric base but with a higher melting point (195° C.) and is mounted on the frame 3. By means of a battery charger, the element 10 is heated for thirty seconds at a voltage of 24 volts. The temperature of the element 10 attains 200° C. The window-pane 2 is applied against the frame 3 with a pressure of 10 kg for a period of a few seconds. In less than one minute, bonding is complete.

EXAMPLE 2

A window-pane which is ready to be installed is employed as shown in FIG. 4. The finishing seal 6 has a base of EPDM and contains a metallic insert 7 in immediate proximity to the glass pane 2 in order to fix by Joule effect the thermoplastic adhesive 5 having a base of aliphatic polyurethane as manufactured by the Quinn Company.

The anti-overflow strip 9 includes the partially embedded heating element 10 and is of elastomeric material having a base of EPDM.

Adhesive bonding of said window-pane is carried-out as follows : a voltage of 45 volts is applied to the heating element of the anti-overflow strip 9 for a period of twenty seconds prior to application of the window-pane against the frame 3 by means of a press.
Temperature of heating element 10: 200° C.
Temperature of frame 3: approx. 160° C.
Application pressure: approx. 10 kg.

The total time of assembly of the window-pane is less than 1 minute.

As will be readily apparent, the invention is not limited to the examples of construction described in the foregoing and a large number of modifications can accordingly be made in these examples without thereby departing either from the scope or the spirit of the invention.

In the embodiment of FIG. 6, the metallic frame 3 has an outwardly-bent edge portion 3a on which is engaged the U-shaped hook portion 13a of a metallic insert 13. Said U-shaped hook portion 13a is embedded in a strip 14 of plastic material.

What is claimed is:

1. A device (1) for fixing a window-pane (2) and in particular an automobile windshield, rear window or fixed side window on a rigid frame (3), said window-pane (2) being provided with a bead (5, 12) of thermoplastic material at its periphery and on that face (4) which is intended to be applied against the rigid frame (3), said rigid frame being constituted by a wall (8) which is intended to receive said bead (5, 12) and which extends toward the interior of the frame, wherein said device comprises a sectional strip (9) of plastic material to which is secured a resistance-type heating element (10) of resilient metal having a substantially U-shaped cross-section, one wing (10a) of said heating element being secured to the sectional strip (9) and the other wing (10b) being free with respect to said strip so as to form therewith a clip which is capable of resilient engagement on said wall (8) of the rigid frame (3).

2. A device according to claim 1, wherein one wing (10a) of the heating element (10) is embedded in the plastic material of the sectional strip (9).

3. A device according to claim 2, wherein the width (1) of the sectional strip (9) is so determined as to ensure that said strip covers substantially the entire surface of the frame wall (8) opposite to the wall which is intended to receive the thermoplastic bead (5, 10).

4. A device according to claim 1, wherein the free wing (10b) of the heating element (10) is so shaped that it can be resiliently applied on the surface (8a) of the frame wall (8) which is intended to receive the thermoplastic bead (5, 12), the length of the free wing (10b) being sufficient to ensure that said wing comes into contact with the bead (5, 12) of thermoplastic material which is placed at the periphery of the window-pane.

5. A device according to claim 1, wherein the free wing (10b) of the heating element (10) is provided with recesses (11).

6. A device according to claim 1, wherein the edge of the free wing (10b) of the heating element (10) is bent-back in the outward direction.

7. A device according to claim 1, wherein the sectional strip (9) of plastic material has a substantially L-shaped cross-section, one wing (9a) of said strip being intended to cover the frame-wall surface opposite to the surface which is intended to receive the bead (5, 12) of thermoplastic material and the other wing (9b) being intended to extend toward the exterior of the frame (3) in order to mask said bead (5, 12).

8. A device according to claim 7, wherein the length of said other wing (9b) of the sectional member (9) is substantially equal to the thickness of the bead (5) of thermoplastic material when the window-pane (2) is placed within the frame (3).

9. A device according to claim 7, wherein the edge of said other wing (9b) of the sectional strip (9) has an elastic lip (9c) which is intended to be resiliently applied against the internal face (4) of the window-pane (2).

* * * * *